United States Patent [19]

Miyamoto

[11] Patent Number: 4,694,810

[45] Date of Patent: Sep. 22, 1987

[54] FUEL COCK FOR AN INTERNAL COMBUSTION ENGINE

[75] Inventor: Yasuhiko Miyamoto, Ohmiya, Japan

[73] Assignee: Fuji Jukogyo Kabushiki Kaisha, Tokyo, Japan

[21] Appl. No.: 813,106

[22] Filed: Dec. 24, 1985

[30] Foreign Application Priority Data

Dec. 28, 1984 [JP] Japan ................................ 59-278473

[51] Int. Cl.[4] ......................... F02M 37/02; F16K 5/02

[52] U.S. Cl. .................................... 123/516; 123/510; 137/181

[58] Field of Search ................ 123/510, 516; 251/175, 251/181, 185, 192

[56] References Cited

U.S. PATENT DOCUMENTS 3,612,091 10/1971 Gramann et al. ............... 251/181 X

FOREIGN PATENT DOCUMENTS 176,476 12/1980 Japan .................................. 123/516

*Primary Examiner*—Tony M. Argenbright

*Attorney, Agent, or Firm*—Martin A. Farber

[57] ABSTRACT

A valve body has a bore with a tapered bore portion fuel inlet and outlet ports and air inlet and outlet ports which are communicated with the bore. The fuel cock is provided with a fuel plug having a piston end and is rotatably engaged in the tapered bore of the valve body so as to close and open a fuel passage between the fuel inlet and outlet ports, and an air plug rotatably engaged in the bore so as to close and open an air passage between the air inlet and outlet ports. A chamber is formed between the piston end of the fuel plug and the air plug, and the pressure of the air at the air inlet port is applied to the chamber and to the piston end to urge the fuel plug towards a small diameter end so as to insure sealing effect. The fuel plug and air plug are so arranged as to close and open both the fuel passage and air passage at the same time.

7 Claims, 7 Drawing Figures

FUEL COCK FOR AN INTERNAL COMBUSTION ENGINE

BACKGROUND OF THE INVENTION

The present invention relates to a plug cock for controlling the supply of fuel in a small or a portable engine, wherein opening and closing of an air vent of a fuel tank is synchronized with that of a fuel supply passage.

The fuel cock of a compact engine is generally provided in the fuel supply passage communicating a fuel tank with a carburetor. On the other hand, the fuel tank must be opened to the atmosphere so as to avoid such problems as leakage of fuel caused by expansion of gases in the inner space of the fuel tank during the transportation of the engine or at high ambient temperature, and a shortage of fuel supply to the engine due to low pressure in the tank. Accordingly, an air venting device is provided. In such an air venting device, when the engine is off, or during the transportation of the engine by a vehicle, the fuel is vaporized thereby raising the pressure in the tank, so that the vaporized fuel leaks out of the tank causing odors. Therefore, the air passage of the air venting device is adapted to be able to open and close, for example, by providing a plug cock which is synchronized with a fuel plug. Japanese Utility Model Laid-open No. 55-176476 discloses a conventional plug cock having the above described structure.

In a such a plug cock, the plug had to be tightly engaged with a valve body and sealed with an O-ring in order to make it pressure-tight when the pressure in the fuel tank is high. However, if the O-ring wears out during use, the air passage of the air vent and the fuel supply passage communicate with each other, causing the vapor lock phenomenon wherein air is admitted into the fuel supply passage and the fuel supply to the carburetor is cut off. Therefore, the plug cock has to be disassembled to replace the O-ring periodically.

In addition, because of tight engagement of the plug, large torque is needed to rotate the plug. In addition, the torque is constant regardless of the level of pressure in the tank. Accordingly, even if the pressure is low, a large torque is necessary to rotate the plug.

SUMMARY OF THE INVENTION

An object of the present invention is to provide a plug cock wherein the vapor lock caused by communication of an air passage with a fuel supply passage is prevented. Another object is to decrease the torque needed for manipulation of the plug cock when the pressure in a fuel tank is low and the pressure applied to the plug can be increased when the pressure in the tank rises.

The other objects and features of this invention will become understood from the following description with reference to the accompanying drawings.

DETAILED DESCRIPTION OF THE PREFERRED EMBODIMENT

Figure 1:
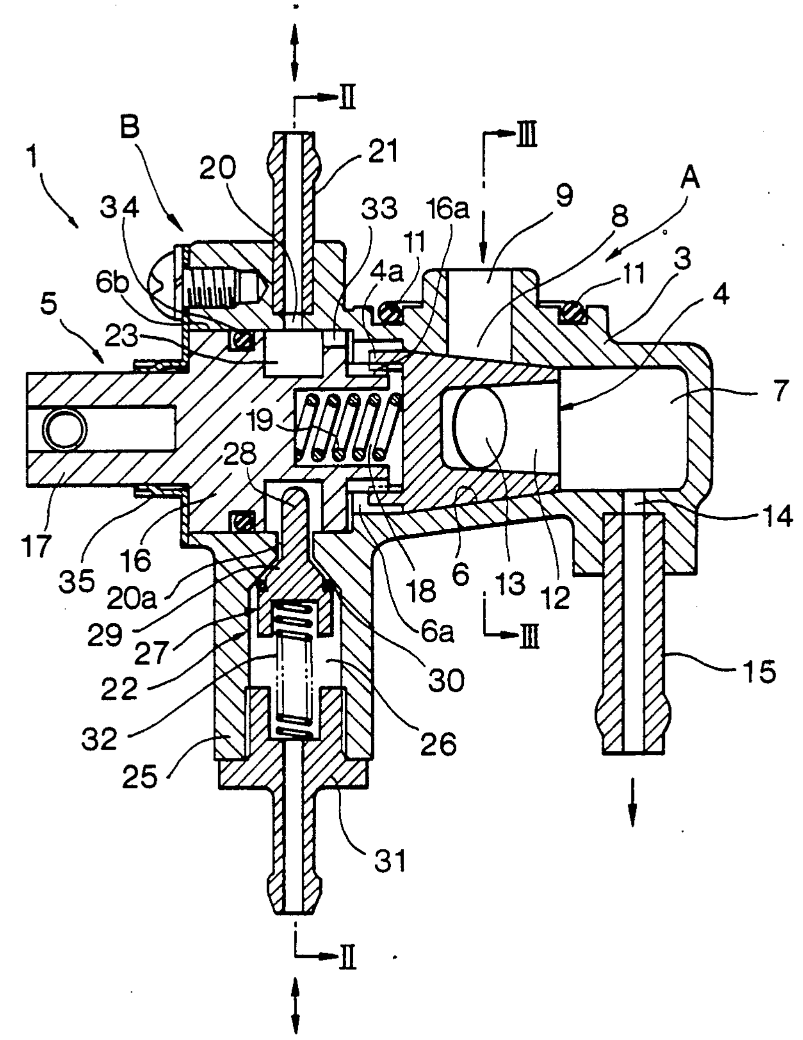
FIG. 1 is a sectional view of a plug cock according to the present invention.
Figure 3:
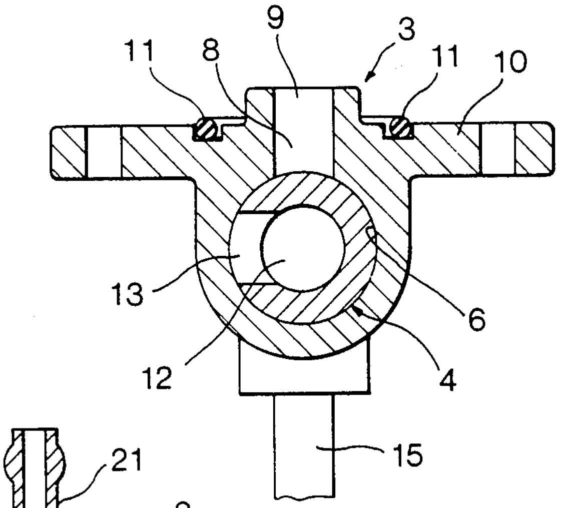
FIG. 3 is a sectional view of the plug cock taken along the line III—III of FIG. 1.

Referring to FIGS. 1 to 4, a plug cock 1 for controlling the flow of fuel is provided at a bottom portion of a sealed fuel tank 2 for a small or portable engine. The plug cock 1 comprises a cock A for fuel passage and a cock B for air passage, each provided inside of a valve body 3. The plug cock 1 has a fuel plug 4 for fuel passage and an air plug 5 for air passage, to control the flow. Inside the valve body 3 a bore 6 is formed in which the plugs 4 and 5 are coaxially disposed, and a chamber 7 is provided at one end portion. The outer periphery of the plug 4 is tapered to form a frustum of a cone rotatably engaged in the bore 6. Vertically formed in the valve body 3 at the position confronting the side periphery of the plug 4 is a fuel inlet passage including port 8 communicating with the bore 6 and an upper end thereof forming a fuel inlet 9. As shown in FIG. 3, a flange 10 is disposed around the inlet 9, for mounting the cock body 3 to a bottom portion of the fuel tank 2 interposing an O-ring 11 as a sealing member. A bore 12 is formed in the end of the plug 4 to a predetermined depth in the axial direction and an opening 13 is formed to communicate the port 8 with the chamber 7 through the bore 12. A fuel outlet 14 communicates with the chamber 7 and a pipe connector 15 is secured to the valve body 3 at the fuel outlet port 14. Therefore, when the plug 4 is rotated a predetermined angle to communicate the opening 13 with the passage 8, 9, fuel flows through the inlet 9, fuel inlet port 8, opening 13, bore 12, chamber 7, outlet port 14 and pipe connector 15.

The air plug 5 is co-axially disposed with the plug 4 at the other side of the bore 12. The plug 5 comprises a cylindrical portion 16, which is rotatably engaged in a cylindrical bore portion *6b* of the bore 6 for opening and closing the air passage (20, 21, *20a*, 26) and a stem 17 which projects in the direction opposite the plug 4. The inner end of the plug 5 has a small diameter portion which is slidably engaged in a cylindrical portion of the plug 4 by means for transmitting the rotation of the plug 5 such as splines *16a*. Between the plugs 4 and 5, a chamber *6a* is formed so that the end portion *4a* of the plug 4 functions as a piston. At the inner end of the plug 5, a recess 18 is formed to house a coil spring 19 urging both plugs 4 and 5 in opposite directions.

Figure 2:
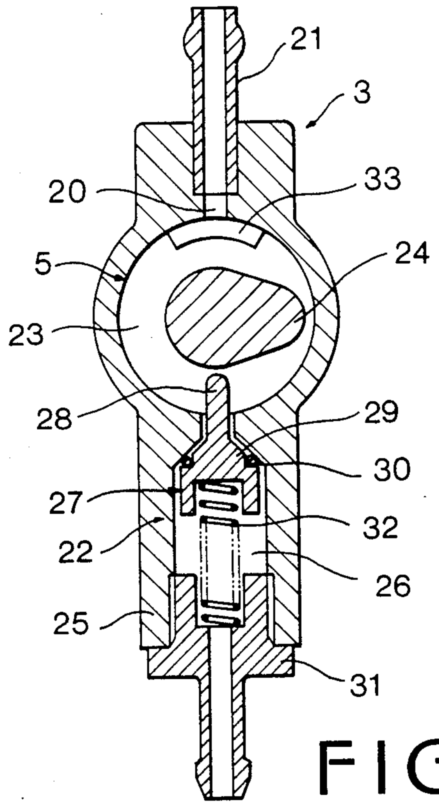
FIG. 2 is a sectional view of the plug cock taken along the line II—II of FIG. 1.

At an upper portion of the cock body 3 in which the cylindrical portion 16 is mounted, an air inlet port 20 to which a pipe connector 21 is connected is formed, thereby forming the air passage. At an air outlet port *20a* provided in a bottom portion of the valve body 3 opposing the port 20, an air valve 22 is provided in a valve bore 26 formed in a cylindrical projection 25 of the valve Body 3. An annular groove 23 communicated with the port 20 is formed on the outer periphery of the cylindrical portion 16 of the plug 5. The groove 23 is shallow at a certain place thereby forming a cam portion 24 as shown in FIG. 2.

The valve bore 26 has an inside wall formed as a frustum of a cone and communicates with the groove 23. The valve 22 comprises a poppet valve 27 with a projection 28 and a frustum portion 29 at the middle. The frustum portion 29 is provided with an O-ring 30. The projection 28 of the poppet valve 27 projects into the groove 23 of the plug 5. A pipe connector 31 is engaged in the bore 26 of the projection 25, enclosing a coil spring 32 provided between the poppet valve 27 and the pipe connector 31 to urge the poppet valve 27 toward the plug 5. Therefore, the air passage is closed when the poppet valve 27 is in contact with the tapered portion of the bore 26. The air passage is opened when the plug 5 is rotated to a position where the poppet valve 27 is pushed downward by the cam 24 against the urging of the coil spring 32. The opening 13 and the cam 24 are adapted to synchronize the opening and closing of the fuel passage and the air passage by turning the stem 17.

A passage 33 is provided in the cylindrical portion 16 of the plug 5 for communicating the groove 23 with chamber 6*a*. Accordingly, the pressure in the fuel tank 2 is applied to the piston portion 4*a* of the plug 4 through the air passage including port 20 and the groove 23. An O-ring 34 is disposed on the periphery of the cylindrical portion 16 of the plug adjacent the stem 17 for sealing. A guide member 35 is fixed to the end surface of the valve body 3 to rotatably support the plug 5.

Figure 4:
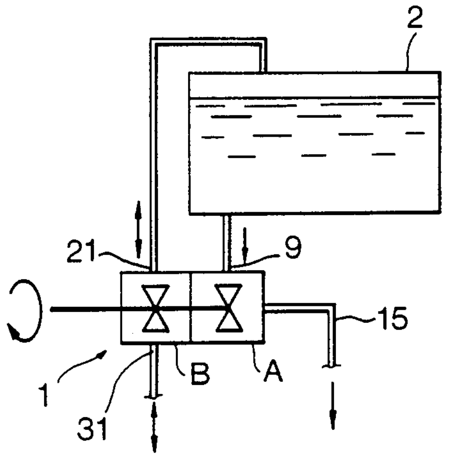
FIG. 4 is a diagram showing an arrangement of passages according to the present invention.

As shown in FIG. 4, the plug cock 1 is arranged to communicate the inlet 9 with a bottom of the fuel tank 2 and the pipe connector 15 with a carburetor (not shown) through other connecting pipes. On the other hand, the pipe connector 21 is communicated with the vent opening provided in an upper portion of the tank 2 and the other pipe connector 31 is opened to the atmosphere.

Figure 7:
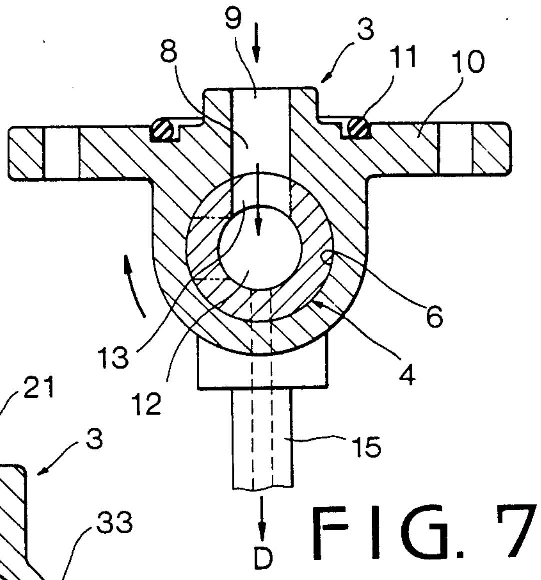
FIG. 7 is a sectional view similar to FIG. 3 showing the plug cock when the fuel passage is opened.
Figure 6:
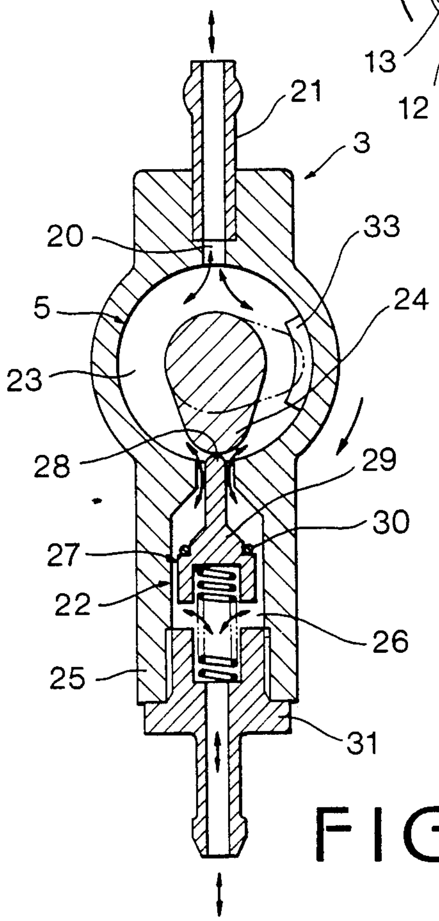
FIG. 6 is a sectional view similar to FIG. 2 showing the plug cock when the air passage is opened.

The operation of the fuel plug cock 1 is described hereinafter. At the starting of the engine, the plugs 4 and 5 which are at the closed position as shown in FIGS. 2 and 3 are rotated to the opened position shown in FIGS. 6 and 7 by turning the stem 17 by a knob (not shown). At the open position, the cam 24 of the plug 5 pushes the poppet valve 27 against the coil spring 32 to open the air valve 22, so that the air vent passage of the fuel tank 2 is opened to discharge the vapors therein to the atmosphere. At the same time, fuel plug 4 is also rotated via the splines 16*a* to open the fuel passage (7–8, 12–15) so that the fuel is supplied to the carburetor from the fuel tank 2.

Figure 5:
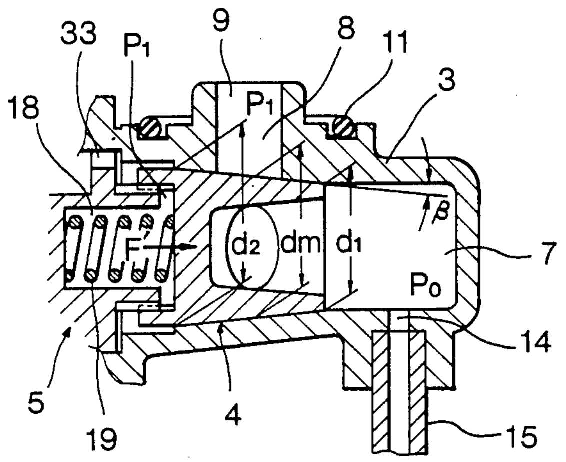
FIG. 5 shows a part of the plug cock of FIG. 1 in section.

When the engine is in non-operative state, the knob of the shaft 17 is turned in the opposite direction as before, so that the plug cock 1 is closed. Therefore the fuel supply passage and the air passage are interrupted and the vapor does not leak from the fuel tank 2. In the closed state of the plug cock 1, plug 4 needs torque T and sealing pressure $P_R$ as described hereinafter. Referring to FIG. 5, the torque T is expressed as follows.

$$T = \frac{dm}{2} \times \frac{F + F'}{\sin\beta + \mu\cos\beta}$$

wherein $P_0$ is the pressure in the chamber 7 in the closed state, $P_1$ is the pressure in the fuel tank 2 (which becomes the same value as that in the air passage and fuel passage), $d_1$ is the outer diameter of the small diameter end of the plug 4, $d_2$ is the diameter of the large diameter end of plug 4, $\beta$ is the taper angle of the plug 4, $\mu$ the coefficient of friction, and F' is the load of the coil spring 19.

$$dm = \frac{(d_1 + d_2)}{2}$$

and $$F' = \frac{(P_1 - P_0) \cdot \pi dm2}{4}$$

wherein F'' is the force applied to the air passage side of plug 4. Therefore, the sealing pressure $P_R$ can be expressed as, $$P_R = \frac{F + F'}{\sin\beta + \mu\cos\beta}$$

Accordingly, when the pressure $P_1$ in the fuel tank 2 is low, the pressure $P_R$ is allowed to be low. When the pressures $P_1$ and $P_0$ are the same value, the needed torque is the value of the load of the coil spring 19. When the pressure $P_1$ in the fuel tank 2 becomes high, the pressure $P_R$ is increased so that the torque becomes normal value.

In the present embodiment, although the plugs 4 and 5 are horizontally disposed in the cock body 3, they may be also vertically disposed.

From the foregoing, it will be understood that the present invention provides a plug cock wherein the pressure in the air passage is applied to the fuel plug 4 so that torque for rotating the plug is decreased when the pressure in the fuel tank is low and increased when the pressure is high. Additionally a plug having a shape of frustum of a cone is provided for sealing, without employing an O-ring, so as to prevent the communication of the air passage and the fuel passage.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A fuel cock for an internal combustion engine comprising:

a valve body having a tapered bore portion and a cylindrical bore portion, said tapered bore portion having a fuel inlet port and a fuel outlet port, said cylindrical bore portion having an air inlet port and an air outlet port;

said fuel inlet port and fuel outlet port being communicated with a bottom of a fuel tank and a carburetor, respectively, said air inlet port being communicated with a vent passage of the fuel tank;

an air outlet passage provided in said valve body being communicated with the atmosphere and said air inlet port;

a fuel plug, having a large diameter portion at one end thereof and a small diameter portion at an opposite end thereof and a tapered periphery between said ends, rotatably engaged in the tapered bore portion of the valve body so as to selectively close and open a fuel passage between the fuel inlet port and the fuel outlet port and axially displaceable in the tapered bore portion so as to serve as a piston;

an air plug having a cam portion and said air plug being positioned adjacent the large diameter portion of the fuel plug defining a chamber therebetween and rotatably engaged in the cylindrical bore portion;

said air plug forming a passage so as to apply fluid pressure at the air inlet port to the chamber to urge the fuel plug towards the small diameter end of said fuel plug;

valve means mounted in said air outlet passage including a projection slidably engaged with said cam portion to selectively close and open said air outlet passage dependent on rotatary position of said air plug; and the fuel plug and air plug being so arranged as to open both the fuel passage and the air outlet passage at the same time so as to discharge vapor in the fuel tank to the atmosphere and to supply fuel to the carburetor from the fuel tank at the same time and respectively so as to close both the fuel passage and the air outlet passage at the same time.

2. The fuel cock according to claim 1 further comprising a spring provided in said chamber between the fuel plug and air plug so as to urge the fuel plug towards the small diameter portion.

3. The fuel cock according to claim 1 further comprising splines jointly rotatably engaging the fuel and air plugs in a manner so as to permit axial movement of the fuel plug.

4. A fuel cock for an internal combustion engine according to claim 1, wherein said air plug is axially non-displaceably mounted in said cylindrical bore.

5. A fuel cock for an internal combustion engine comprising:

a valve body having a tapered bore therein, fuel inlet and outlet ports and air inlet and outlet ports which are communicated with the bore, said fuel inlet port and said air inlet port communicating with fuel and vapor portions of a fuel tank respectively;

a fuel plug having a tapered periphery and a large diameter end so as to serve as a piston, said fuel plug being rotatably engaged in the tapered bore of the valve body so as to close and open a fuel passage between the fuel inlet and the outlet ports and being axially slightly movable towards its small diameter end;

an air plug rotatably engaged in the bore so as to close and open an air passage between the air inlet and outlet ports and mounted in the bore axially non-displaceably adjacent the large diameter end of the fuel plug defining a chamber between and substantially entirely along the large diameter end of the fuel plug and the air plug;

a passage formed in the air plug communicating the air inlet port with the chamber so as to apply fluid pressure from the vapor portion of the fuel tank at the air inlet port to the chamber to urge the fuel plug towards its small diameter end;

means for transmitting rotation of one of the plugs to the other of said plugs, the fuel plug and air plug being so arranged as to close and open both the fuel passage and the air passage at the same time; and said fuel passage includes a chamber in said bore formed between the valve body and the fuel plug.

6. The fuel cock according to claim 5, wherein substantially all of the area of said large diameter portion at said end of said fuel plug being formed so as to receive the vapor pressure of the fuel tank.

7. The fuel cock according to claim 5, wherein said chamber of said fuel passage includes an axial bore in the small diameter end of said fuel plug.

* * * * *